(12) United States Patent
Beeson

(10) Patent No.: US 9,737,949 B2
(45) Date of Patent: *Aug. 22, 2017

(54) WELDING SYSTEMS POWERED BY HYBRID VEHICLES

(71) Applicant: ILLINOIS TOOL WORKS INC., Glenview, IL (US)

(72) Inventor: Richard Beeson, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,886

(22) Filed: May 9, 2016

(65) Prior Publication Data

US 2016/0250707 A1    Sep. 1, 2016

Related U.S. Application Data

(63) Continuation of application No. 14/171,326, filed on Feb. 3, 2014, now Pat. No. 9,333,583, which is a continuation of application No. 12/783,265, filed on May 19, 2010, now Pat. No. 8,640,799.

(60) Provisional application No. 61/186,160, filed on Jun. 11, 2009.

(51) Int. Cl.
*B60K 25/00* (2006.01)
*B23K 9/10* (2006.01)
(Continued)

(52) U.S. Cl.
CPC .......... *B23K 9/1006* (2013.01); *B23K 9/1043* (2013.01); *B60K 6/50* (2013.01);
(Continued)

(58) Field of Classification Search
CPC ...... B23K 9/1006; B23K 9/1043; B60K 6/50; B60K 25/02; B60K 25/00;
(Continued)

(56) References Cited

U.S. PATENT DOCUMENTS

| 3,770,976 A | * | 11/1973 | Stroud | H02J 7/1438 |
| | | | | 219/133 |
| 4,470,476 A | * | 9/1984 | Hunt | B60K 6/26 |
| | | | | 180/65.25 |

(Continued)

FOREIGN PATENT DOCUMENTS

| JP | 20050224838 | 9/2003 |
| WO | 20080156946 | 2/2006 |

OTHER PUBLICATIONS

International Search Report for application No. PCT/EP2010/038010 mailed Sep. 15, 2010.

(Continued)

*Primary Examiner* — Drew J Brown
(74) *Attorney, Agent, or Firm* — Fletcher Yoder, P.C.

(57) ABSTRACT

A hybrid vehicle including a welder that is adapted to be powered off a direct current (DC) bus generated by the electronics of the hybrid vehicle is provided. A variety of exemplary placements of the welder on or in the hybrid vehicle are provided. Additionally, a parallel hybrid configuration, a series hybrid configuration, and a series-parallel configuration including welding converter circuitry that is adapted to utilize the DC bus from the hybrid vehicle to generate welding power are provided.

14 Claims, 3 Drawing Sheets

(51) Int. Cl.
*B60K 6/50* (2007.10)
*B60K 25/02* (2006.01)
*B60K 6/44* (2007.10)
*B60K 6/46* (2007.10)
*B60K 6/48* (2007.10)

(52) U.S. Cl.
CPC .............. *B60K 25/00* (2013.01); *B60K 25/02* (2013.01); *B60K 6/44* (2013.01); *B60K 6/46* (2013.01); *B60K 6/48* (2013.01); *B60K 2006/4825* (2013.01); *B60K 2025/005* (2013.01); *B60Y 2200/92* (2013.01); *B60Y 2400/87* (2013.01); *Y10S 903/902* (2013.01); *Y10S 903/951* (2013.01)

(58) Field of Classification Search
CPC .... B60K 2006/4825; B60K 6/46; B60K 6/44; B60K 2025/005; B60K 6/48; B60Y 2400/87; B60Y 2200/92; Y10S 903/951; Y10S 903/902
See application file for complete search history.

(56) References Cited

U.S. PATENT DOCUMENTS

| | | | | |
|---|---|---|---|---|
| 4,508,954 A * | 4/1985 | Kroll | B23K 9/1087 | 219/132 |
| 4,785,227 A * | 11/1988 | Griffin | H02J 9/066 | 290/4 R |
| 5,250,786 A * | 10/1993 | Kikuchi | B23K 9/1056 | 219/130.32 |
| 5,410,126 A * | 4/1995 | Miller | B23K 9/1043 | 219/130.1 |
| 5,436,427 A * | 7/1995 | Bourque | B23K 9/1043 | 219/130.01 |
| 5,563,451 A * | 10/1996 | Furukawa | B60K 25/06 | 180/53.8 |
| 5,574,622 A * | 11/1996 | Brown | F02B 63/04 | 307/150 |
| 5,670,070 A * | 9/1997 | Clark | B23K 9/0953 | 219/130.33 |
| 5,917,711 A * | 6/1999 | Shikata | H02M 3/33569 | 363/16 |
| 6,023,037 A * | 2/2000 | Church | B23K 9/1006 | 219/121.39 |
| 6,177,645 B1 * | 1/2001 | Church | B23K 9/1006 | 219/121.39 |
| 6,237,211 B1 * | 5/2001 | Clare et al. | B60R 11/06 | 29/401.1 |
| 6,286,609 B1 * | 9/2001 | Carrier | B25F 5/02 | 173/1 |
| 6,291,798 B1 * | 9/2001 | Stava | B23K 9/1006 | 219/130.32 |
| 6,720,678 B2 * | 4/2004 | Green | B23K 9/10 | 219/132 |
| 6,747,246 B2 * | 6/2004 | Crandell, III | B23K 9/1006 | 219/130.1 |
| 6,777,649 B2 * | 8/2004 | Reynolds | B23K 9/1081 | 219/130.1 |
| 7,017,327 B2 * | 3/2006 | Hunt | B60W 10/08 | 56/14.7 |
| 7,166,818 B2 * | 1/2007 | Stava | B23K 9/092 | 219/130.51 |
| 7,231,994 B2 * | 6/2007 | Buglione | B60K 6/26 | 180/65.31 |
| 7,339,134 B2 | 3/2008 | Stropki | | |
| 7,424,925 B2 * | 9/2008 | Buglione | B60K 6/26 | 180/65.31 |
| 7,654,349 B2 * | 2/2010 | Lee | B60K 6/26 | 180/53.8 |
| 7,658,249 B2 * | 2/2010 | Buglione | B60K 6/26 | 180/65.31 |
| 7,673,713 B2 * | 3/2010 | Betz | B60L 1/003 | 180/65.1 |
| 7,745,952 B2 * | 6/2010 | Nakatsu | B60L 11/08 | 257/706 |
| 7,777,447 B2 * | 8/2010 | Vogel | B23K 9/1081 | 219/130.4 |
| 7,938,217 B2 * | 5/2011 | Stansbury, III | B60K 25/10 | 180/165 |
| 8,008,800 B2 * | 8/2011 | Mackin | A01D 41/1274 | 180/53.5 |
| 8,115,334 B2 * | 2/2012 | Vyas | B60K 6/46 | 307/10.1 |
| 8,134,244 B2 * | 3/2012 | Wurth | B64F 1/34 | 290/1 A |
| 8,256,544 B2 * | 9/2012 | Tarasinski | A01B 59/00 | 180/53.5 |
| 8,870,206 B1 * | 10/2014 | Bandy | B60G 3/20 | 280/124.135 |
| 2002/0179349 A1 * | 12/2002 | Field | B60K 6/40 | 180/65.23 |
| 2003/0066819 A1 * | 4/2003 | Shahani Shargh | H05B 1/02 | 219/50 |
| 2003/0164645 A1 | 9/2003 | Crandell, III | | |
| 2003/0189338 A1 * | 10/2003 | Rose, Sr. | B60K 6/26 | 290/1 R |
| 2005/0109550 A1 | 5/2005 | Buglione | | |
| 2006/0037953 A1 * | 2/2006 | Matthews | B23K 9/1006 | 219/133 |
| 2006/0090437 A1 | 5/2006 | Hunt | | |
| 2006/0231532 A1 * | 10/2006 | Bunker | B23K 10/006 | 219/121.54 |
| 2006/0273075 A1 * | 12/2006 | Samodell | B23K 9/0732 | 219/130.4 |
| 2007/0181547 A1 | 8/2007 | Vogel | | |
| 2008/0093347 A1 * | 4/2008 | Yamaguchi | H05H 1/36 | 219/121.54 |
| 2008/0271935 A1 * | 11/2008 | Mese | B60K 6/26 | 180/53.5 |
| 2009/0139781 A1 * | 6/2009 | Straubel | B60L 11/1875 | 180/65.1 |
| 2009/0229902 A1 * | 9/2009 | Stansbury, III | F03G 7/08 | 180/165 |
| 2009/0294191 A1 * | 12/2009 | Sheidler | B60K 6/48 | 180/65.31 |
| 2010/0133900 A1 * | 6/2010 | King | B60L 11/1816 | 307/9.1 |
| 2010/0286856 A1 * | 11/2010 | Le Brusq | B60K 6/28 | 701/22 |
| 2010/0301672 A1 * | 12/2010 | Di Cristofaro | H02B 1/52 | 307/39 |
| 2011/0011113 A1 * | 1/2011 | Jordan | B60R 16/0236 | 62/291 |
| 2011/0241913 A1 * | 10/2011 | Ikeda | H03M 1/12 | 341/118 |
| 2012/0049792 A1 * | 3/2012 | Crombez | B60L 11/1862 | 320/109 |
| 2012/0242156 A1 * | 9/2012 | Butzmann | H02J 7/0013 | 307/82 |
| 2012/0313575 A1 * | 12/2012 | Stansbury, III | B60K 25/10 | 320/107 |
| 2013/0043723 A1 * | 2/2013 | Daniels | H02J 7/35 | 307/23 |
| 2014/0263245 A1 * | 9/2014 | Ulrich | B23K 9/1075 | 219/133 |

OTHER PUBLICATIONS

Lincoln Electric, "Multi-Weld 350 Arc Converter Service Manual," Jul. 2000. http://www.red-d-arc.com/pdf/MX350%20Service%20Manual.pdf.

\* cited by examiner

WELDING SYSTEMS POWERED BY HYBRID VEHICLES

CROSS-REFERENCE TO RELATED APPLICATIONS

This is a Continuation patent application of U.S. patent application Ser. No. 14/171,326, entitled "Welding Systems Powered by Hybrid Vehicles", filed on Feb. 3, 2014, which is a Continuation patent application of U.S. patent application Ser. No. 12/783,265, entitled "Welding Systems Powered by Hybrid Vehicles", filed on May 19, 2010, and issued as U.S. Pat. No. 8,640,799 on Feb. 4, 2014, which is a Non-Provisional patent application of U.S. Provisional Patent Application No. 61/186,160, entitled "Hybrid Vehicle Welder", filed on Jun. 11, 2009, all of which are herein incorporated by reference.

BACKGROUND

The invention relates generally to welding systems, and, more particularly, to welding systems powered off of hybrid vehicles.

Welding is a process that has become increasingly ubiquitous in various industries and applications. For example, welding is used to join workpieces in applications such as construction, shipbuilding, factory equipment repair, and so forth. Accordingly, welding is often performed in close proximity to one or more work vehicles used to transport supplies to the work location, to aid in construction performed at the work location, and so forth. Such work vehicles are typically associated with high emissions levels and high engine noise levels that may decrease productivity. Additionally, if such vehicles are required to be run for the duration of the workday, such as to power welding or other operations, high fuel consumption may lead to high fuel costs, higher total emissions, and reduced life of the vehicle engine.

Somewhat apart from such applications, a variety of hybrid work vehicles, including trucks have been developed that utilize power from both an engine and a battery to provide the required power for locomotion and any other on-board operations. Such hybrid vehicles are often more efficient than conventional vehicles powered by internal combustion engines alone, and so are particularly attractive for applications in which emissions, noise, and so forth are of concern. As in other hybrid applications, the ability of such vehicles to serve their intended functions typically depends upon the actual application demands, particularly in terms of the duty cycle imposed on the battery and engine. To date, little or no synergy has been developed between such hybrid vehicle development and applications requiring intermittent welding capability.

BRIEF DESCRIPTION

In one exemplary embodiment described below, a welding system includes a hybrid vehicle including an engine and an energy storage device. The engine and the energy storage device are adapted to cooperate with electronic circuitry to generate a direct current (DC) bus output. The welding system also includes a welding device coupled to the hybrid vehicle and adapted to utilize the DC bus output from the hybrid vehicle as a source of power.

In another embodiment, a hybrid vehicle includes an engine and an energy storage device adapted to cooperate with the engine to generate a DC bus output and to drive a motor. The hybrid vehicle also includes converter circuitry coupled to the engine and the energy storage device and adapted to receive the DC bus output and to convert the DC bus output to a power output appropriate for use by a welding device.

In another embodiment, a welding device includes an engine and a generator driven by the engine to produce weld power. The welding device also includes converter circuitry adapted to receive a DC bus power output from electronic circuitry located in a hybrid vehicle, to convert the DC bus power output to a welding power output, and to transfer the welding power output to the engine.

DRAWINGS

These and other features, aspects, and advantages of the present invention will become better understood when the following detailed description is read with reference to the accompanying drawings in which like characters represent like parts throughout the drawings, wherein.

Figure 5:
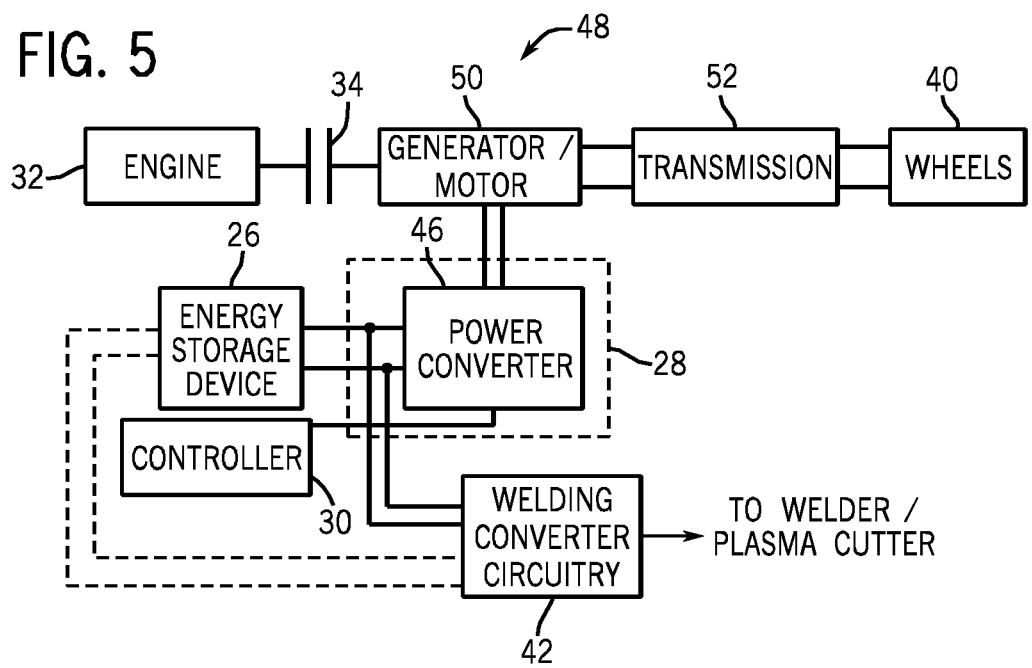
Figure 6:
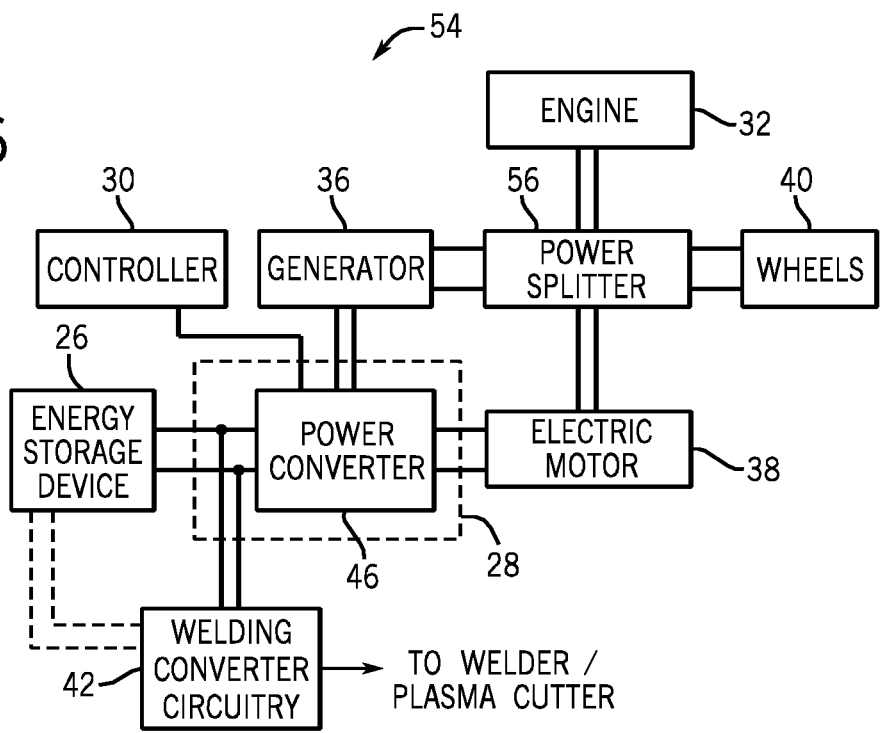

FIG. 5 is a block diagram illustrating exemplary components of a parallel configuration drivetrain that may be located in the hybrid vehicle of the previous figures in accordance with aspects of the present invention; and FIG. 6 is a block diagram illustrating exemplary components of a series-parallel configuration drivetrain that may be located in the hybrid vehicle of the previous figures in accordance with aspects of the present invention.

DETAILED DESCRIPTION

As described in detail below, embodiments are provided of a hybrid vehicle including a welder that is adapted to be powered off a DC bus generated by the electronics of the hybrid vehicle. That is, presently contemplated embodiments provide welders either permanently or removably coupled to hybrid vehicles for operation in such positions. To that end, a variety of exemplary placements of the welder on or in the hybrid vehicle are provided. For instance, the welder may be integrated into one or more sides of the hybrid vehicle for use by a welding operator. Furthermore, a variety of configurations of internal components of the hybrid vehicle are provided. For example, embodiments of a parallel hybrid configuration, a series hybrid configuration, and a series-parallel configuration including welding converter circuitry that is adapted to utilize the DC bus from the hybrid vehicle to generate welding power are provided. Still further, it should be noted that the term welder, as used herein, could be any welding or plasma cutting system designed to provide power and/or consumables to a welding or plasma cutting operation. For example, the welder may be any system designed for use in a metal inert gas (MIG) welding operation, tungsten inert gas (TIG) welding operation, stick welding operation, pulse welding operations, constant current process, constant voltage processes, and so forth.

Figure 1:
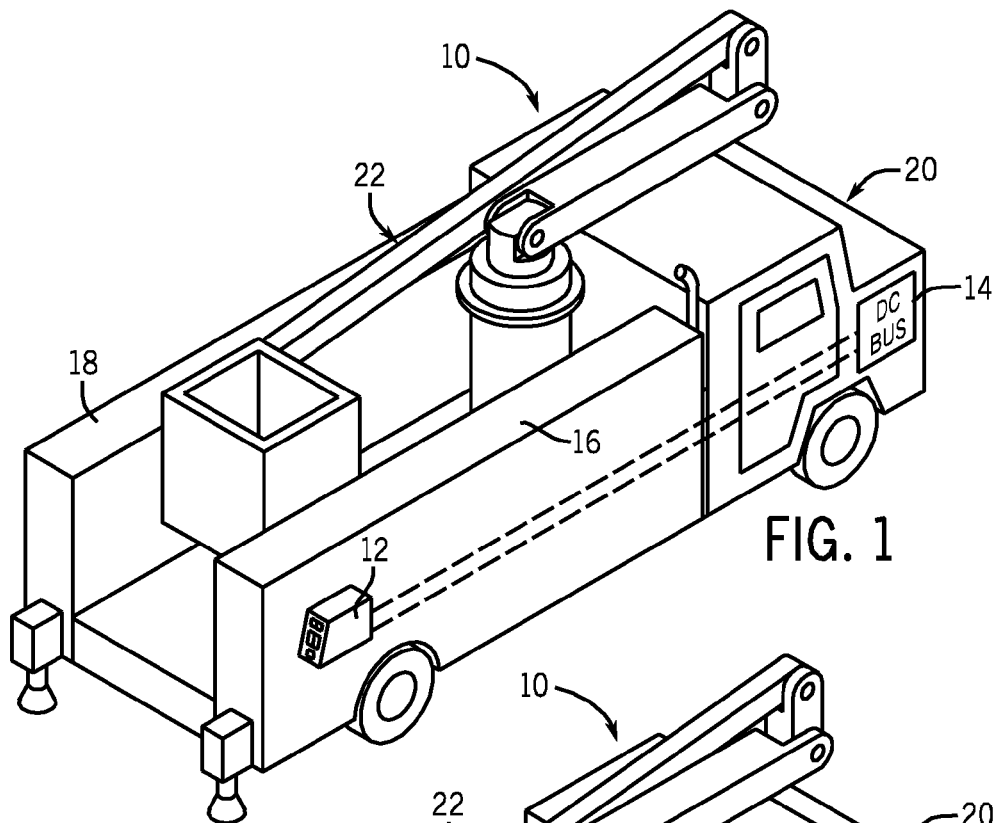
FIG. 1 illustrates an exemplary hybrid work vehicle including a welder integrated into a hybrid work vehicle and coupled to an internal vehicle DC bus to utilize power generated by the hybrid work vehicle in accordance with aspects of the present invention.

Turning now to the drawings, FIG. 1 illustrates a hybrid work vehicle 10 including a welder 12 coupled to a DC bus 14 to utilize power generated by the hybrid work vehicle 10. In this particular arrangement, the hybrid work vehicle 10 includes a first side panel 16, a second side panel 18, and a front end compartment 20, although such vehicles may be variously equipped, often depending upon the type of application for which they are designed (e.g., construction, service, farming and ranching, etc.). The illustrated hybrid work vehicle 10 is a work truck, yet other embodiments of the hybrid vehicle may include other types and configurations of vehicles. In the illustrated embodiment, the welder 12 is located in the first side panel 16 of the work vehicle 10. The welder 12 may be configured to be operated while remaining in the side panel 16, or some other location of the vehicle in some embodiments. That is, the welder may be fully integrated into the vehicle design. For instance, the welder 12 may be located in a compartment that is adapted to open for use and to close to protect the welder 12 during transportation or when use of the welder 12 is not desired. For further example, the welder 12 may be located in the side panel 16 such that a control panel of the welder is accessible to the user. Still further, the welder may be configured to be removed from the side panel 16 of the hybrid vehicle 10 for use. In such embodiments, the welder 12 remains connected to the DC bus 14 of the hybrid vehicle 10 to utilize the vehicle power via one or more cables or conduits.

Figure 2:
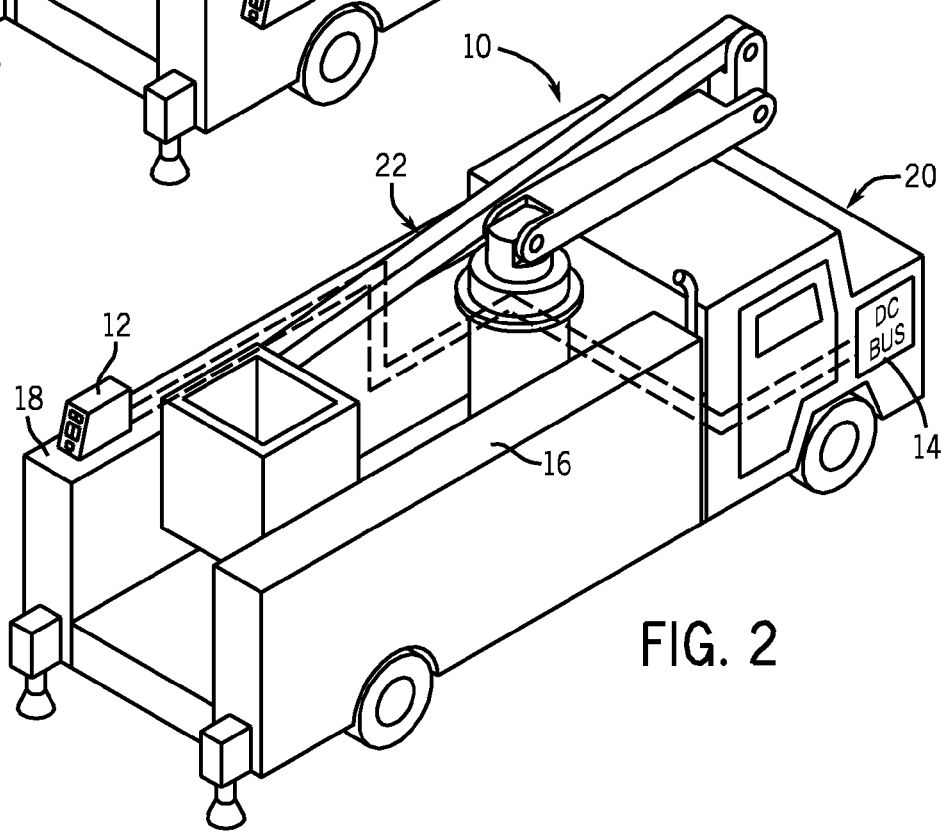
FIG. 2 illustrates an exemplary hybrid work vehicle including a non-integrated welder (located on top of a side of the hybrid work vehicle) and coupled to a DC bus to similarly utilize power generated by the hybrid work vehicle in accordance with aspects of the present invention.
Figure 3:
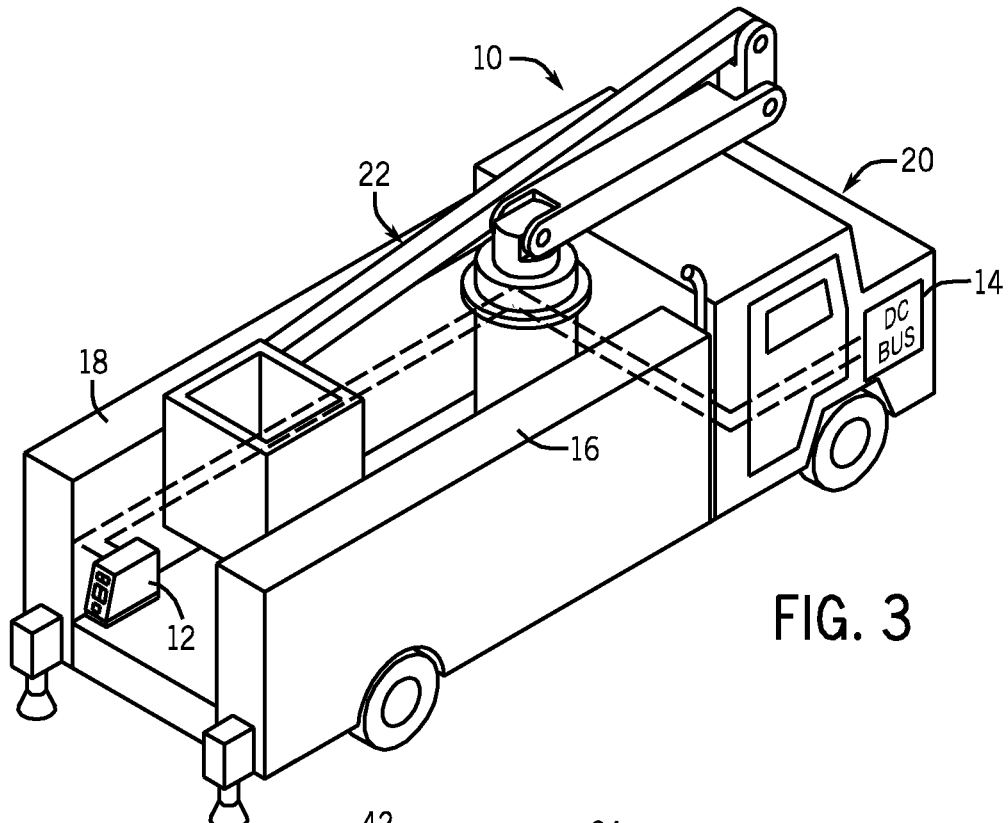
FIG. 3 illustrates an exemplary hybrid work vehicle including a separate welder (located next to a side of the hybrid work vehicle) and coupled to a DC bus to again utilize power generated by the hybrid work vehicle in accordance with aspects of the present invention.

FIGS. 2 and 3 illustrate alternate placements of the welder in and on the hybrid vehicle 10. Specifically, FIG. 2 illustrates the welder 12 positioned on top of the second side panel 18 for use in a welding operation. As before, the welder 12 is connected to and receives power from the DC bus of the hybrid vehicle. In this embodiment, the welder 12 may be configured to be mounted in the illustrated position when the hybrid vehicle is stopped at a work location and to be stored within the vehicle during transportation, such as when being transported to and from a garage or parking lot.

FIG. 3 illustrates an embodiment of the hybrid vehicle 10 with the welder 12 located adjacent to the second side panel 18 of the hybrid vehicle 10. In this embodiment, the welder 12 may be configured for use while located next to the second side panel 18 or may be configured to be removed from the hybrid truck for use. However, as before, the welder 12 is coupled to the DC bus 14 of the hybrid welder during operation. Indeed, it should be noted that the welder 12 may be located anywhere on, in, or around the hybrid vehicle 10 during operation such that the welder may still be coupled to the DC bus 14. For example, the welder may be located around the front end 20 of the hybrid vehicle 10 and connected to the DC bus 14 via an external connection. It should also be noted that such embodiments enable the use of a hybrid vehicle DC bus-powered welder on any desired hybrid vehicle, not simply trucks and work vehicles.

The DC bus 14 output of the hybrid vehicle may be any of a variety of possible output voltage levels. For example, in some embodiments, the DC bus output 14 may be between approximately 48 volts and approximately 400 volts. As such, a variety of welding converter circuitry may be provided to convert the output received from the hybrid vehicle to an output suitable for use by a welding or cutting device. For example, in embodiments in which the DC bus output is greater than approximately 100 volts, the welding converter circuitry may include isolation circuitry adapted to isolate the high voltage output of the DC bus from an end user. For further example, if the DC bus output is greater than approximately 100 volts, the converter circuitry may also include a buck converter, a transformer, an inverter, or some combination thereof. As such, it should be noted that a variety of components may be included in such converter circuitry depending on the voltage level of the DC bus output.

Figure 4:
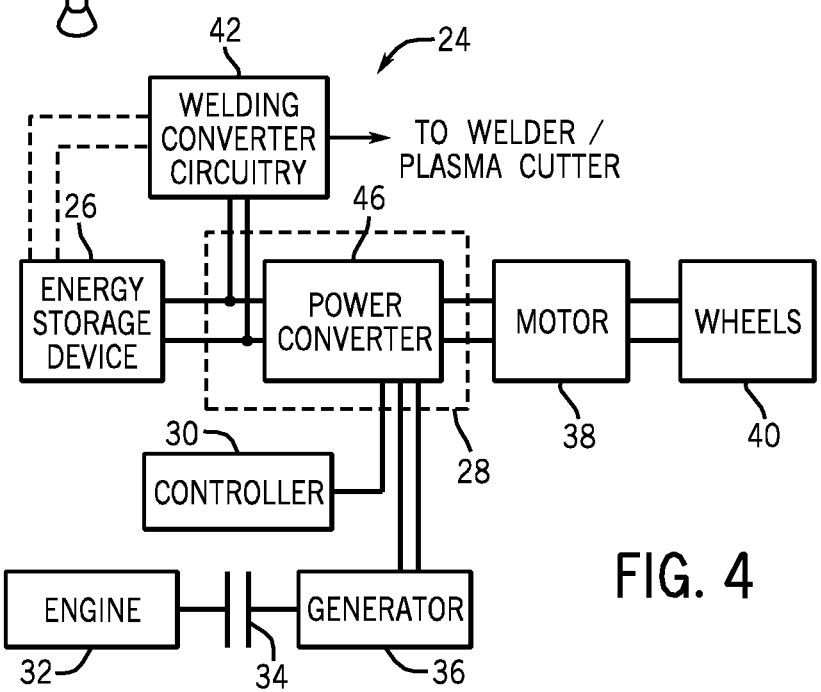
FIG. 4 is a block diagram illustrating exemplary components of a series configuration drivetrain that may be located in the hybrid vehicle of the previous figures in accordance with aspects of the present invention.

FIG. 4 is a block diagram illustrating components of an exemplary drivetrain 24 arranged in a series configuration that may be located in the hybrid vehicle. The series drivetrain 24 includes an energy storage device 26 (e.g., a battery), electronics 28, a controller 30 for the electronics 28, an engine 32, a clutch 34, a generator 36, a motor 38, wheels 40, and welding converter circuitry 42. In the illustrated embodiment, the electronics 28 include a power converter 46. However, in additional embodiments the electronics may include additional components, such as additional power converters, rectifiers, capacitors, and so forth suitable for the given application. The energy storage device 26 may be any device capable of storing and dissipating energy, such as a battery, a fuel cell, a solar cell, a capacitor, and so forth.

The welding converter circuitry 42 may be positioned in a variety of suitable locations. That is, although the welding converter circuitry 42 is illustrated adjacent to the drivetrains in the illustrated embodiments, such circuitry may be located in the hybrid vehicle, in the welding device, or in a separate enclosure. Indeed, the converter circuitry need not be located in the hybrid vehicle in some embodiments. Furthermore, the welding converter circuitry 42 may include a variety of components, such as rectifiers, capacitors, and so forth. For example, in one embodiment, the welding converter circuitry may be a one to one transformer configured for isolation operating in conjunction with a chopper circuit. Still further, the welding converter circuitry may be determined based on the DC bus output of the hybrid vehicle. For example, for high bus voltages, the converter circuitry may be a DC to DC inverter. For further example, the converter circuitry may be a DC to AC inverter when used with tungsten inert gas (TIG) or auxiliary welding applications.

During operation of the hybrid vehicle, the energy storage device 26 and the engine 32 are configured to cooperate to power the hybrid vehicle and rotate the wheels 40 as desired. Concurrently, the welding converter circuitry 42 is configured to draw power from the DC bus output in the electronics 28 and convert the power to an output suitable for use by a welder, plasma cutter, or similar device. It should be noted that the DC bus output may also be drawn from alternate locations, such as from the energy storage device 26. In this way, internal components of the hybrid vehicle 10 may be configured to generate both the power necessary for the proper functioning of the vehicle as well as the power needed by an associated welding device. Indeed, existing hybrid vehicles may be adapted to provide power for a welding operation by coupling the welding device to the DC bus output of the hybrid vehicle and providing welding converter circuitry adapted to convert the DC bus output to a suitable power output for the welding device.

In particular, when a low power output is required, the energy storage device 26 may provide power through the power converter 46 to the motor 38, which drives the wheels

40. As the desired power output increases, the engine 32 supplements the power provided from the energy storage device 26 to the motor 38 via the clutch 34 and the generator 36. During instances when the required vehicle power remains steady, the power from the engine 32 may be utilized to charge the energy storage device 26. As such, the power converter 46 may be configured to operate as an AC to DC converter or as a DC to AC converter, depending on the flow of power through the circuitry. For example, when discharging, the energy storage device 26 may be configured to output an AC power output, which is converted to the DC bus output by the power converter 46 acting as an AC to DC converter, rectifying the output of the energy storage device 26. However, when charging the energy storage device 26, the power converter 46 may be configured to receive DC power and output AC power. Indeed, the power converter 46 may be configured to convert between AC power and DC power as needed by the system.

The controller 30 coupled to the electronics 28 may facilitate the process of switching the functionality of the power converter 46 between an AC to DC converter and a DC to AC converter. That is, the controller 30 may receive one or more feedback signals indicating whether the energy storage device 26 is charging or discharging and may direct the function of the converter 46 accordingly. The controller 30 may also direct the operation of the electronics 28 to ensure that the DC bus output utilized by the welding converter circuitry 42 is appropriately output at a level suitable for a welding operation. To this end, the controller 30 may individually control the converter 46 to meet the needs of the system. Furthermore, if additional components are included in the electronic circuitry 28, the controller 30 may output different control signals to each of the components as necessary.

As will be appreciated by those skilled in the art, unlike conventional internal combustion engine-powered vehicles, which typically include an alternator driven by the engine, and capable of charging a 12 volt (or in come cases, 24 volt or other battery), the DC bus of a hybrid vehicle is typically maintained at a much higher voltage level, such as on the order of hundreds of volts. Accordingly, depending upon the type of waveform (or more generally, power) desired for welding, in accordance with the present technique, welding may be accomplished by drawing power directly from the DC bus, with no conversion circuitry, or with circuitry for performing only minimal conversion (e.g., voltage regulation). This will typically be the case where a DC welding process is performed. Where more complex waveforms are desired (e.g., pulsed waveforms, waveforms for AC welding, conversion circuitry coupled to and powered by the internal DC bus may generate such waveforms, and include control circuitry of generally known topologies for this purpose.

It should be noted that in some embodiments described above the welder may not be permanently integrated into the vehicle, but connected to the DC bus when welding operations are desired. In such cases, the vehicle may be designed to provide a convenient location at which the welder (or in some cases, simply weld cables) may be connected, such as under a cover or panel what can be opened to provide access, and closed when not in use.

It should also be noted that, although the present discussion contemplates performing welding operations powered by the internal DC bus of a hybrid vehicle, in some embodiments the welder or welding power circuitry may be able to be powered by this as well as other sources. For example, the welder may also use batteries, capacitors or other energy storage devices as an alternate (or even principal) source of power. Power generation capabilities, such as fuel cells and engine-generators may also be used as a secondary or primary power source. Further, where desired, a connection to the power grid may be provided, such as for welders that are removable from the vehicle, or for integrated welders that are sometimes used when the vehicle is in proximity to a grid connection (e.g., in a shop or garage).

FIG. 5 is a block diagram illustrating components of an exemplary drivetrain 48 arranged in a parallel configuration that may be located in the hybrid vehicle. The parallel drivetrain 48 includes the engine 32, the clutch 34, a generator/motor unit 50, a transmission 52, wheels 40, an energy storage device 26, electronics 28, the controller 30 for the electronics, and the welding converter circuitry 42. As before, the parallel configuration drivetrain may be configured to provide power for the hybrid vehicle operations. In doing so, the drivetrain 48 generates a DC bus suitable for use as a primary welding power source. However, in the parallel configuration, both the engine 32 and the generator/motor 50 generate the power to drive the wheels 40. This is in contrast to the series drivetrain configuration in which the motor 38 exclusively generates such power.

During operation of the parallel configuration drivetrain 48, the energy storage device 26 outputs power that is routed through the electronics 28 (e.g., a power converter) to the generator/motor unit 50 and to the engine 32 to start the engine 32 when desired. When an increase in power demand occurs, the engine 32 provides the primary source of power to the generator/motor 50, to the transmission 52, and to the wheels 40. The energy storage device may also provide a secondary power source through the electronics 28 to the generator/motor unit 50 and through the transmission 52 to the wheels 40. During steady state conditions, the engine 32 may power any desired rotation of the wheels 40 and a recharging of the energy storage device 26. As such, as before, the power converter 46 may be configured to operate as a DC to AC converter or as an AC to DC converter.

The welding converter circuitry 42 is configured to draw power from the DC bus generated when the energy storage device 26 discharges and the first power converter rectifies the power output from the energy storage device 26. It should be noted that the DC bus output may be drawn from any of a variety of suitable locations, such as from the energy storage device 26, the electronics 28, or both. The welding converter circuitry 42 then converts the DC bus output to an output suitable for the welding or plasma cutting device. Since the converter circuitry 42 is adapted to receive the DC bus output that is already generated by the hybrid vehicle electronics, embodiments of the present invention may be utilized in conjunction with existing hybrid vehicles by supplying appropriate converter circuitry that interfaces with the existing DC bus output.

FIG. 6 is a block diagram illustrating components of an exemplary drivetrain 54 arranged in a series-parallel configuration that may be located in the hybrid vehicle. The series-parallel drivetrain 54 includes the energy storage device 26, the electronics 28, the controller 30 associated with the electronics 28, the generator 36, the electric motor 38, a power splitter 56, the engine 32, the wheels 40, and the welding converter circuitry 42. In this configuration, the engine 32 is configured to both directly drive the motion of the wheels 40 and to allow the electric motor 38 to drive the wheel rotation when desired.

During use, when a low power demand is desired, the energy storage device 26 outputs power to the power converter 46, which rectifies the power output of the energy storage device 26. The power converter 46 then routes the power to the electric motor 38, which powers the wheels 40 through the use of the power splitter 56. When a greater power demand is desired, power from the engine 32 is routed by the power splitter 56 through the generator 36 to supplement the power from the energy storage device 26. When the hybrid vehicle is operating at a steady state condition, the engine 32 supplies power through the power splitter 56, to the generator 36, and through the second power converter 46 to power the electric motor 38, which drives the wheels 40. Concurrently, the power converter 46 may route energy back to the energy storage device 26 to recharge the device while the steady state condition persists.

As before, the controller 30 is adapted to individually regulate the activity of the components of the electronic circuitry 28. The welding converter circuitry 42 is adapted to draw power from the DC bus generated by the drivetrain 54 in the electronics 28 and convert the DC bus power to a power output suitable for use by the welder or plasma cutter. It should be noted that the DC bus output may be drawn from any of a variety of suitable locations, such as from the energy storage device 26, the electronics 28, or both. As such, the welding converter circuitry 42 may include rectifiers, capacitors, and any other electrical circuitry needed for the given application.

While the illustrated embodiments show welding converter circuitry as associated with series, parallel, and series-parallel drivetrains, it should be noted that embodiments of the present invention may be utilized in conjunction with any hybrid vehicle. That is, the DC bus in any part of any type of drivetrain may be utilized as a source of power for a welding device. Still further, the hybrid vehicle need not be a hybrid work vehicle as illustrated herein. Indeed, the welding converter circuitry may be utilized with any hybrid vehicle, such as hybrid cars or trucks. Furthermore, the illustrated components of the shown drivetrains are merely exemplary, and other drivetrains may include additional components not shown or may eliminate some of the illustrated components. Still further, while embodiments of the present invention may be used with hybrid vehicles as described herein, it should be noted that in certain embodiments, the DC bus of alternate vehicles, such as plug-in electric vehicles may also be utilized to power one or more welding devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding or cutting device comprising:
converter circuitry configured to receive a direct current (DC) power from a DC bus of a hybrid vehicle and to convert the DC power to a welding or cutting output suitable for direct use in a welding or cutting operation.

2. The welding or cutting device of claim 1, wherein the converter circuitry comprises isolation circuitry configured to isolate the DC power.

3. The welding or cutting device of claim 1, wherein the converter circuitry comprises a transformer and an inverter.

4. The welding or cutting device of claim 1, wherein the converter circuitry comprises a DC to DC inverter.

5. The welding or cutting device of claim 1, wherein the converter circuitry comprises a DC to an alternating current (AC) inverter.

6. The welding or cutting device of claim 1, wherein the hybrid vehicle is a hybrid work truck.

7. The welding or cutting device of claim 6, wherein the welding or cutting device is integrated into the hybrid work truck.

8. The welding or cutting device of claim 7, wherein the welding or cutting device is accessible to an operator via a removable panel that encloses the welding or cutting device in a side of the hybrid work truck.

9. The welding or cutting device of claim 1, wherein the welding or cutting device is configured to utilize one or more of a battery, a capacitor, a separate energy storage device, a fuel cell, an engine-generator, and a power grid as a source of power.

10. The welding or cutting device of claim 1, wherein the DC power received from the DC bus of the vehicle is greater than 48 volts.

11. The welding or cutting device of claim 10, wherein the DC power received from the DC bus of the vehicle is greater than 100 volts.

12. The welding or cutting device of claim 10, wherein the DC power received from the DC bus of the vehicle is less than 400 volts.

13. The welding or cutting device of claim 1, wherein the welding or cutting device is a welding device.

14. The welding or cutting device of claim 1, wherein the welding or cutting device is a cutting device.

* * * * *